United States Patent [19]

Shimada et al.

[11] Patent Number: 5,066,186

[45] Date of Patent: Nov. 19, 1991

[54] DUST DISCHARGING APPARATUS FOR A FURNACE

[75] Inventors: Kazumi Shimada; Masaaki Chikazawa, both of Tokyo, Japan

[73] Assignee: Azuma Tekko Kabushiki Kaisha, Tokyo, Japan

[21] Appl. No.: 578,918

[22] Filed: Sep. 7, 1990

[51] Int. Cl.⁵ .............................................. F16K 1/20
[52] U.S. Cl. .................................. 414/221; 222/442; 222/450; 251/58; 251/298; 137/613; 137/629; 414/291
[58] Field of Search ............... 414/199, 200, 217, 221, 414/287, 291, 292; 222/442, 450; 251/58, 298, 299, 364; 137/629

[56] References Cited

U.S. PATENT DOCUMENTS

| | | | |
|---|---|---|---|
| 3,090,593 | 5/1963 | Pro | 222/450 X |
| 3,682,339 | 8/1972 | Knappstein | 414/199 X |
| 4,089,429 | 5/1978 | Stock et al. | 414/200 |
| 4,144,902 | 3/1979 | Mahr et al. | 251/58 X |

Primary Examiner—Robert J. Spar
Assistant Examiner—James Keenan
Attorney, Agent, or Firm—Armstrong, Nikaido, Marmelstein, Kubovcik & Murray

[57] ABSTRACT

A dust discharging apparatus suitable for use in a dust collector, which comprises series-connected upper and lower dust shoot chambers, each having a swingable discharging valve device to close and open its ceiling opening. In order to prevent dust coating on the seal members of the swingable valves and the wear of same, the swingable valve device uses a downstream-convergent throttle ring, a swingable concave pan-like valve and an upstream divergent bucket fixed to the concave plate. The upper chamber has an exhaust pipe to communicate with the dust hopper, and a suction pipe to permit the chamber to open to the surrounding atmosphere to prevent dust backflow when transferring the dust from the dust hopper to the upper chamber and then from the upper to lower chamber.

5 Claims, 3 Drawing Sheets

DUST DISCHARGING APPARATUS FOR A FURNACE

BACKGROUND OF THE INVENTION

1. Field of the Invention

The present invention relates to a dust discharging apparatus for use in a dust collector which is designed to collect dust from waste gas discharged from a tall furnace or a sintering apparatus.

2. Related Art

Usually, the dust discharging section of a dust collector is kept at a negative pressure with respect to the surrounding atmosphere. From the aspects of security and public nuisance prevention, the dust discharging section is designed to be hermetically sealed. Specifically, such dust discharging apparatus comprises a series-connection of upstream and downstream dust shoot chambers, the upstream dust shoot chamber being connected to the lower end of a dust hopper. Each dust shoot chamber has a swingable plate-like valve and a valve seat around its ceiling opening.

In operation the swingable plate-like valve of the upstream dust shoot chamber is opened to allow dust to fall from the dust hopper, thus loading the upstream dust shoot chamber with dust. Then, the swingable plate-like valve of the downstream dust shoot chamber is opened to shift the dust from the upstream dust shoot chamber to the downstream dust shoot chamber.

However, when the swingable plate-like valve of the upstream dust shoot chamber is opened to allow dust to fall from the dust hopper, the prevailing negative pressure in the dust hopper causes falling dust to rise and return toward the upstream dust shoot chamber. Then, the valve seat of the swingable valve device of the upstream dust shoot chamber and the associated seal member are exposed to dust blast containing hard particles at high temperature. As a result these members are coated with dust particles, and will be easily worn, and will lose sealing effect after a relatively short time. This requires frequent change of expensive seal members.

SUMMARY OF THE INVENTION

In view of the above the object of the present invention is to provide a dust discharging apparatus which prevents dust particles from fixing to the valve seat and associated seal members of the swingable discharging valve device.

To attain this object a dust discharging apparatus according to the present invention comprises: series-connected upper and lower dust shoot chambers, said upper dust shoot chamber being connected to the lower discharging end of a dust hopper, each dust shoot chamber having a swingable discharging valve device to close and open its ceiling opening, said swingable discharging valve device comprising: a dependent hollow cylinder extending down from the ceiling of each of said upper and lower shoot chambers; a downstream-convergent throttle ring integrally connected to the inside of said dependent hollow cylinder; a valve seat integrally connected to the outside of said dependent hollow cylinder; and a swingable valve having a concave plate large enough to accommodate the downstream end of said dependent hollow cylinder when said plate is closed to sit on said valve seat, and an upstream divergent bucket fixed to said concave plate, the upstream-divergent opening of said bucket being somewhat larger than the downstream-convergent opening of said throttle ring.

The upper dust shoot chamber may be equipped with an exhaust pipe to connect the upper dust shoot chamber to the dust hopper via an associated pressure releasing valve device. The exhaust pipe may comprise a dependent section from the upper dust shoot chamber, a "U"-shaped section connected to the dependent section and a rising-and-bending section connected both to the "U"-shaped section and to the dust hopper. The pressure releasing valve device may be placed in the dependent section, and it may comprise a valve seat with a resilient seal member fitted therearound, and a swingable valve the circumferential ridge of which is adapted to abut against the resilient seal member when the swingable valve is closed.

The upper dust shoot chamber may be equipped with a suction pipe, which has a pressure equalizing valve device to permit the upper dust shoot chamber to open to the surrounding atmosphere. The "U"-shaped section may have a drain valve device.

The resilient seal member around the dependent hollow cylinder may have a heating tube wound on the outer and/or inner circumference of the seal member. The heating member is designed to permit high-temperature fluid to flow therethrough.

In operation when the swingable discharging valve is closed with its upstream-divergent bucket facing and encircling the downstream-convergent throttle ring, falling dust converges in the upstream-divergent bucket, and dust is prevented from flowing towards the valve seat. Even when the swingable discharging valve is opened, the throttle ring causes falling dust to converge so that dust is prevented from scattering and fixing to the seal member.

First, the swingable valve is closed in each dust shoot chamber, and the exhaust pipe extending from the upstream dust shoot chamber is closed, too. When the pressure releasing valve is opened in the exhaust pipe, air or gas will flow from the upstream dust shoot chamber to the dust hopper through the exhaust pipe until the pressure of the upstream dust shoot chamber has become equal to the negative pressure prevailing in the dust hopper. Then, the swingable valve of the upstream dust shoot chamber is opened, thereby allowing dust to fall in the chamber without causing backflow, which is the cause for coating the seal member with dust. Preferably, the pressure releasing valve is placed in the dependent section of the exhaust pipe so that air may flow down in the valve, thereby preventing undesired coating of dust on the seal member of the pressure releasing valve.

When the swingable discharging valve is closed in the upstream dust shoot chamber, and when the pressure equalizing valve of the suction pipe is opened, the upstream dust shoot chamber opens to the surrounding atmosphere.

When dust is left in the exhaust pipe, it can be removed by opening the drain valve in the "U"-shaped section of the exhaust pipe.

Moisture condensation of the resilient seal member around the dependent hollow cylinder can be prevented by circulating high-temperature fluid in a heating tube which is wound on the outer and/or inner circumference of the seal member.

Other objects and advantages of the present invention will be understood from the following description of a dust discharging appartus according to one embodi-

PREFERRED EMBODIMENT OF THE INVENTION

Figure 1:
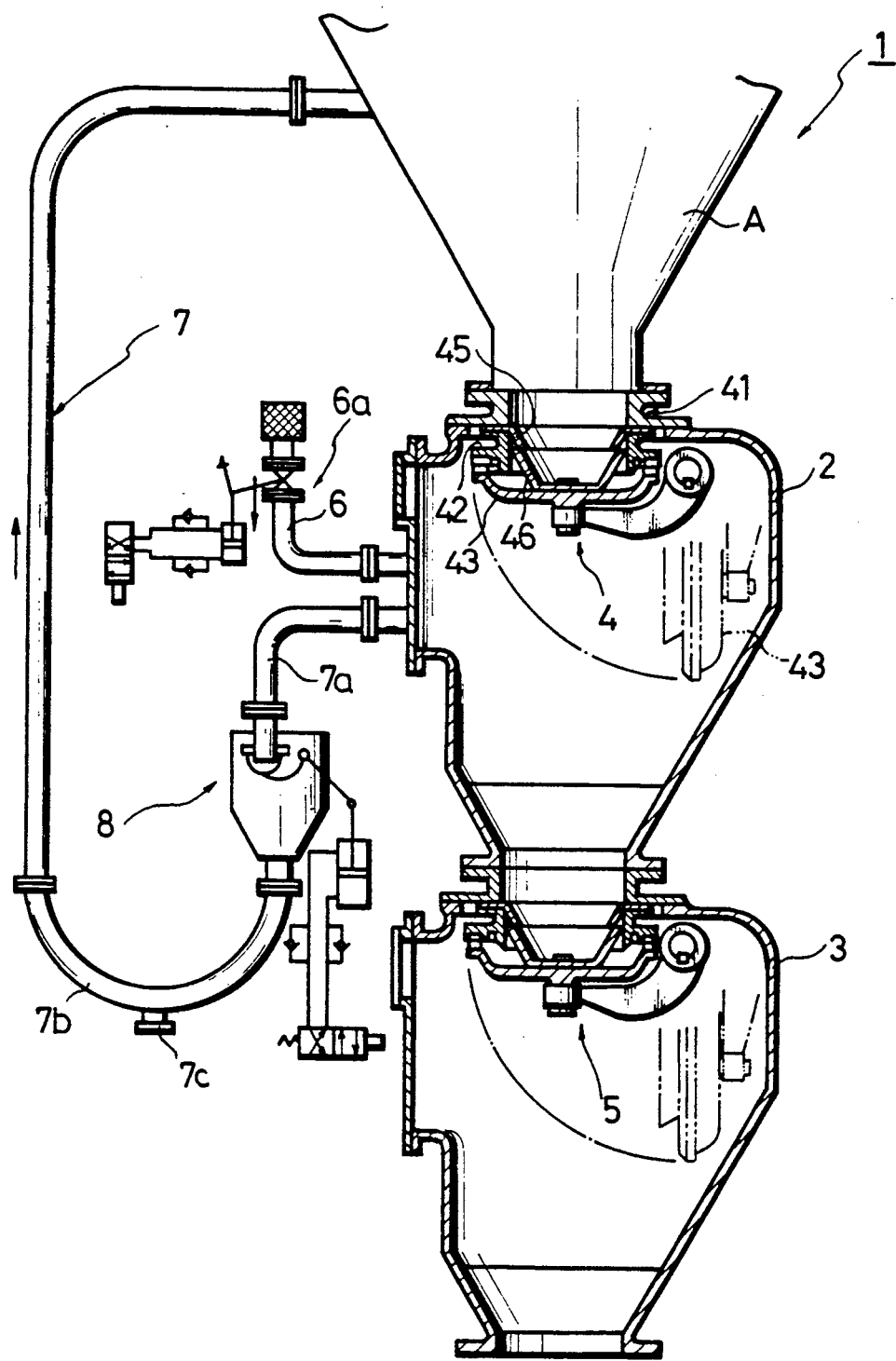
FIG. 1 is a longitudinal section of a dust discharging apparatus according to one embodiment of the present invention.

As seen from FIG. 1, a dust discharging apparatus according to one embodiment of the present invention comprises series-connected upper and lower dust shoot chambers 2 and 3. The upper dust shoot chamber 2 is connected to the lower discharging end of a dust hopper A, in which a negative pressure prevails. Each dust shoot chamber has a swingable discharging valve device 4 or 5 to close and open its ceiling opening.

Figure 2:
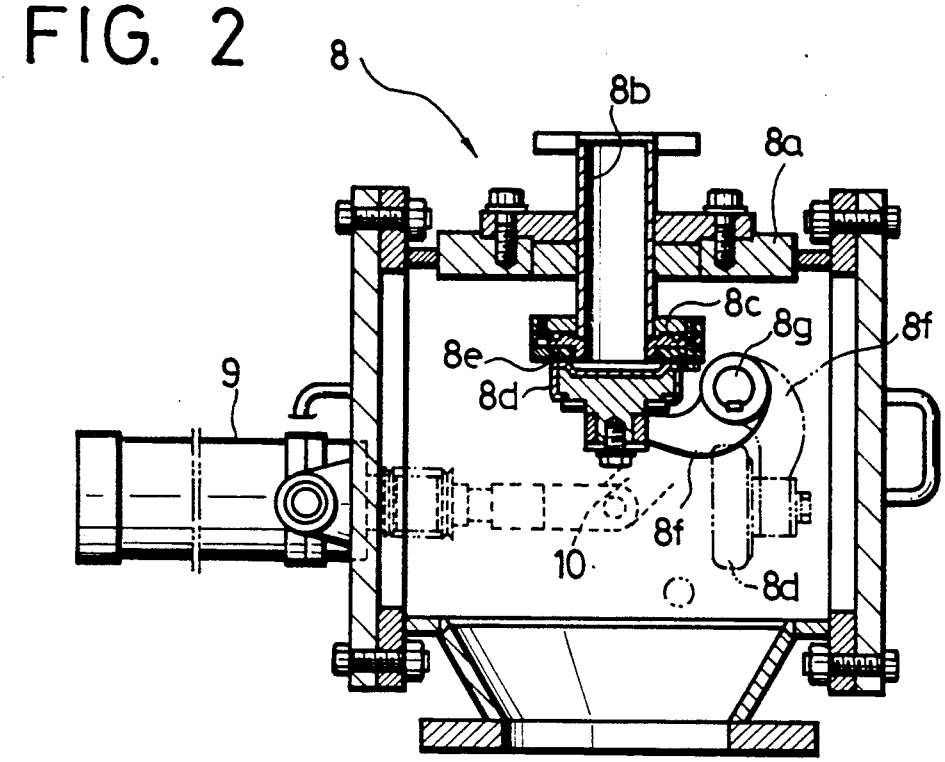
FIG. 2 is a longitudinal section of a pressure releasing valve in an exhaust pipe.

The upper dust shoot chamber 2 is equipped with a suction pipe 6, which has a pressure equalizing valve device 6a to permit the upper dust shoot chamber 2 to open to the surrounding atmosphere, thereby equalizing the inner pressure of the upper dust shoot chamber 2 to the surrounding atmosphere. Also, the upper dust shoot chamber 2 is equipped with an exhaust pipe 7 to communicate the inner space of the upper dust shoot chamber 2 with the inside of the dust hopper A via an associated pressure releasing valve device 8. The exhaust pipe 7 comprises a dependent section 7a from the upper dust shoot chamber 2, a "U"-shaped section 7b connected to the dependent section 7a and a rising-and-bending section connected both to the "U"-shaped section 7b and to the dust hopper A. The pressure releasing valve device 8 is placed in the dependent section 7a of the exhaust pipe 7. As shown in FIG. 2, the pressure releasing valve device 8 comprises a casing 8a, a relatively short tube 8b fixed to the ceiling of the casing and extending inside, a valve seat 8c attached to the lower end of the dependent tube 8b, a resilient seal member 8e placed on the valve seat 8c, and a swingable valve 8d. The upper end of the tube 8b is connected to the dependent section 7a of the exhaust pipe 7, and lower end of the tube 8b remains inside the casing 8a. As shown in FIG. 2, the valve seat 8c in the form of a flange is fixed to the lower end of the dependent tube 8b, and the annular seal packing 8e is fitted around the annular projection of the valve seat 8c.

The arm 8f of the swingable valve 8d is pivoted about the pivot axle 8g. The circumferential ridge of the swingable valve 8d will abut against the resilient seal packing 8e when the swingable valve 8d is closed. A pneumatic actuator in the form of piston-and-cylinder 9 is connected to the pivot axle 8g with a connecting rod 10, thereby permitting the valve 8d to open and close the dependent tube 8b.

The "U"-shaped section of the exhaust pipe 7 has a drain valve device 7c, thus permitting removal of dust from the exhaust tube 7.

Figure 3:
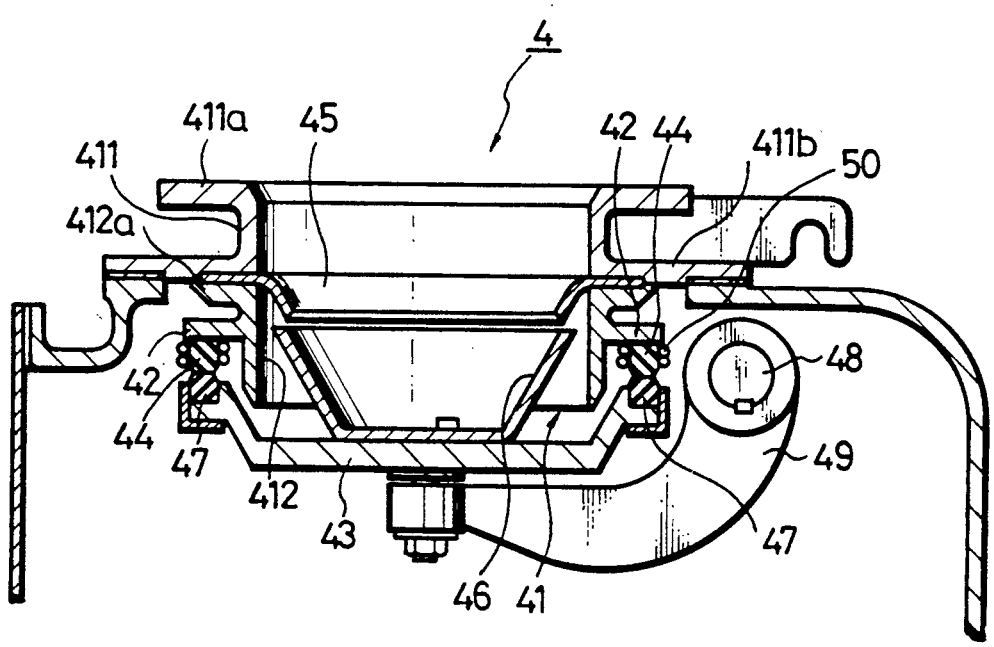
FIG. 3 is a longitudinal section of a swingable discharging valve device.

As is best seen from FIG. 3, the swingable discharging valve device 4 of the upper dust shoot chamber 2 comprises a dependent hollow cylinder 41 connected to the lower end of the dust hopper A by its flange 411a and extending down inside the upper dust shoot chamber 2, a downstream-convergent throttle ring 45 integrally connected to the inside of the dependent hollow cylinder 41, and annular valve seat 42 fixed to the outer circumference of the dependent hollow cylinder 41, and a swingable valve to open and close the dependent hollow cylinder 41. The swingable valve has a concave plate 43 large enough to accommodate the downstream end of the dependent hollow cylinder 41 when the concave plate 43 is closed; and an upstream divergent bucket 46 is fixed to the concave plate 43. The upstream-divergent opening of the bucket 46 is somewhat larger than the downstream-convergent opening of the throttle ring 45.

Specifically, the dependent hollow cylinder 41 is an integral combination of an upper joint 411, a lower dependent annular extension 412 and a downward convergent throttle ring 45 sandwiched therebetween. The upper joint 411 is composed of an annular body having a flange 411a integrally connected to its upper circumference for connection to the bottom end of the dust hopper, and a collar 411b integrally connected to its lower circumference for connecting to the top of the upper dust shoot chamber 2. The lower dependent annular extension is composed of an annular body having a collar 412a integrally connected to its upper circumference, and a valve seat in the form of flange 42 integrally connected to its outer circumference. A resilient hermetic sealing member 44 is placed on the valve seat 42. The bottom end of the dependent extension 412 extends beyond the resilient hermetic annulus 44.

The downward-convergent throttle ring 45 is fixed between the collar 411b of the upper joint 411 and the collar 412a of the dependent extension 412.

The swingable valve 43 is shaped in the form of a concave pan to allow the bottom end of the dependent extension 41 to enter the concave space of the swingable valve when closed. The upward divergent bucket 46 is fixed to the center of the pan-like valve 43 so that it may enter the cylindrical space of the dependent extension 412 just below the downward-convergent throttle ring 45, leaving a small gap between the lower convergent circumference of the throttle ring 45 and the upper divergent circumference of the bucket 46. The upper divergent circumference of the bucket 46 encircles the lower convergent circumference of the throttle ring 45. This arrangement has the effect of preventing dust from scattering out of the inverted frustoconical space delimited by the throttle ring 45 and the bucket 46. As seen from FIG. 3, a resilient sealing annulus 47 is fitted in the circumferential groove of the pan-like valve 43. The pan-like valve 43 is fixed to the free end of a swingable arm 49, which has a pivot axle 48 fixed to the upper dust shoot chamber 2.

Figure 4:
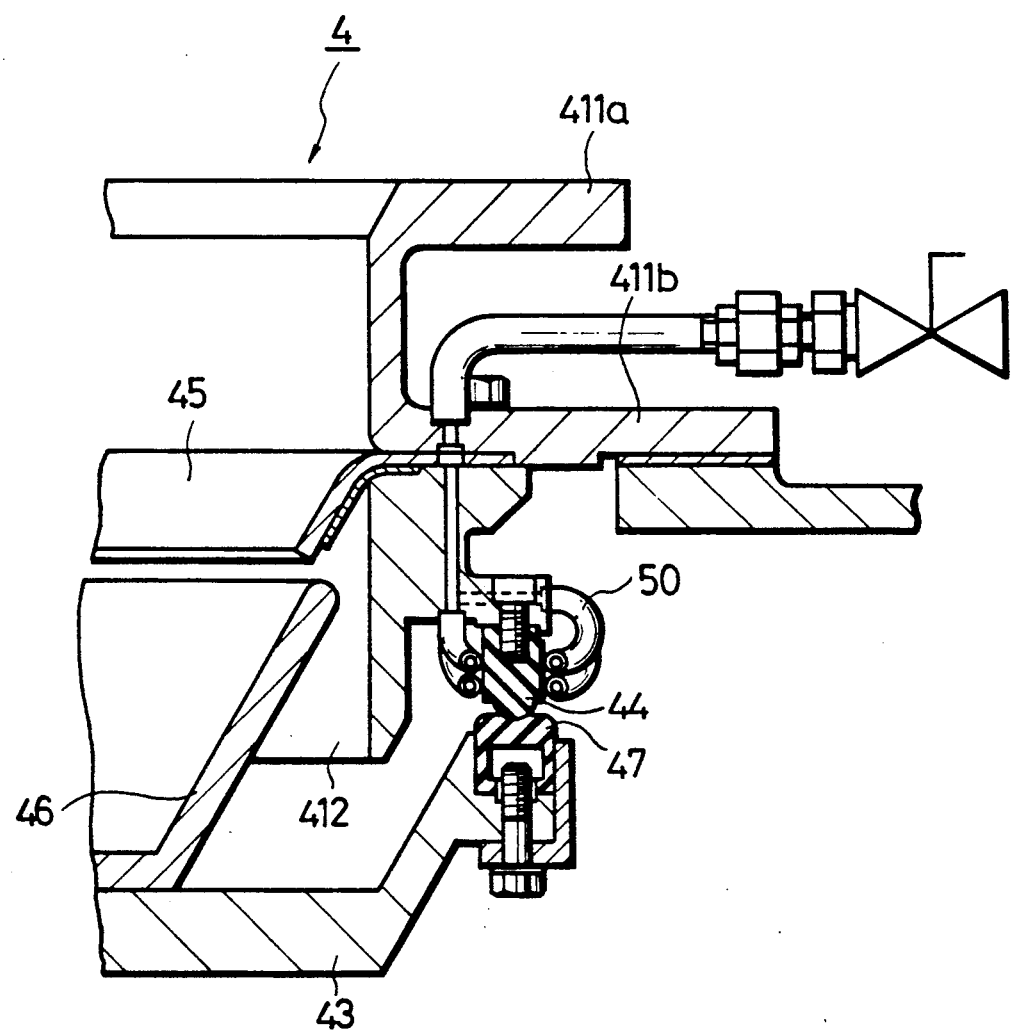
FIG. 4 is an enlarged longitudinal section of a part of FIG. 3, showing some details of the seal member.

As seen from FIG. 4, heating tubes 50 are wound on the outer and inner circumferences of the seal member 44. These heating tubes 50 are connected to a boiler (not shown) via a cock, thereby permitting boiled water to flow through the heating tubes 50 to prevent moisture condensation on the seal member 44.

The dust shoot chamber 3 is of the same structure as the dust shoot chamber 2. The swingable discharging valve 5 of the dust shoot chamber 3 is of the same structure as that of the dust shoot chamber 2. The dust shoot chamber 3 is different from the dust shoot chamber 2 only in that the dust shoot chamber 3 is not equipped with a suction pipe and an exhaust pipe.

The operation of the dust discharging apparatus 1 is described below. The swingable discharging valves 4 and 5 of the upper and lower dust shoot chambers 2 and 3 are closed, and the pressure equalizing valve 6a of the suction pipe 6 and the pressure releasing valve 8 of the exhaust pipe 7 are closed. First, the pressure releasing valve 8 is opened to cause the inside of the upper dust shoot chamber 2 to communicate with the inside of the dust hopper A, thereby equalizing the inside pressure of the upper dust shoot chamber 2 with the inside negative pressure of the dust hopper A. Then, the swingable discharging valve 4 of the upper dust shoot chamber 2 is opened to allow dust to fall down in the upper dust shoot chamber 2. Thereafter, the swingable discharging valve 4 of the upper dust shoot chamber 2 is closed, and the pressure releasing valve 8 of the exhaust pipe 7 is closed. Then, the pressure equalizing valve 6a of the suction pipe 6 is opened to allow air to flow into the inside of the upper dust shoot chamber 2 at the negative pressure, thus equalizing the inside pressure of the upper dust shoot chamber 2 with the surrounding atmosphere, and with the lower dust shoot chamber 3. Finally, the swingable valve 5 of the lower dust shoot chamber is opened to transfer the dust from the upper dust shoot chamber 2 to the lower dust shoot chamber 3. The dust will fall down in the lower dust shoot chamber 3 quite naturally, not causing backflow towards the upper dust shoot chamber 2 because the inner pressure of the lower dust shoot chamber 3 is equal to that of the upper dust shoot chamber 2. The falling dust converges down in the lower dust discharging chamber 3 through the agency of the throttle ring 45. For these reasons the seal packings 44 and 47 will be protected from being coated with dust.

As may be understood from the above, the dependent hollow cylinder has a throttle ring to prevent the scattering of falling dust, and hence the coating of the seal members with dust. In addition, the concave pan-like valve has an upward divergent bucket to prevent the dust from flowing towards the valve seat while the swingable valve is closed, thus preventing the wear and damage of the seal member of the swingable valve. As a consequence the life of the seal member can be substantially extended.

The exhaust pipe has a pressure releasing valve to equalize the inner pressure of the upper dust shoot chamber with that of the dust hopper, thereby assuring that the dust is shifted from the dust hopper to the upper dust shoot chamber without causing the backflow of dust toward the dust hopper when the swingable valve of the upper dust shoot chamber is opened. Therefore, undesired dust coating on the seal member of the swingable valve is prevented, and hence the wear and damage of the seal member of the swingable valve is prevented. Placing the pressure releasing valve in the descendent length of the exhaust pipe is effective to prevent undesired dust coating on the seal member of the pressure releasing valve.

The suction pipe has a pressure equalizing valve to equalize the inner pressure of the upper dust shoot chamber with the surrounding atmosphere or the inner pressure of the lower dust shoot chamber, thereby assuring that the dust can be shifted from the upper dust shoot chamber to the lower dust shoot chamber when the swingable valve of the lower dust shoot chamber is opened.

The "U"-shaped part of the exhaust pipe has a drain valve to permit removal of the dust from the exhaust pipe with ease, thus preventing malfunction of the dust discharging apparatus.

The heating tube wound around the seal member of the swingable discharging valve has the effect of preventing the moisture condensation on the seal member of the swingable valve. This will suppress undesired dust coating on the seal member of the swingable valve.

We claim:

1. A dust discharging apparatus comprising: series-connected upper and lower dust shoot chambers, said upper dust shoot chamber being connected to a lower discharging end of a dust hopper, each dust shoot chamber having a swingable discharging valve device to close and open its ceiling opening, said swingable discharging valve device comprising: a dependent hollow cylinder extending down from the ceiling of each of said upper and lower dust shoot chambers; a downstream-convergent throttle ring integrally connected to the inside of said dependent hollow cylinder; a valve seat integrally connected to the outside of said dependent hollow cylinder; and a swingable valve having a concave plate large enough to accommodate a downstream end of said dependent hollow cylinder when said plate is closed to sit on said valve seat, and an upstream-divergent bucket fixed to said concave plate, the upstream-divergent opening of said bucket being somewhat larger than the downstream-convergent opening of said throttle ring.

2. A dust discharging apparatus according to claim 1 wherein said upper dust shoot chamber is equipped with an exhaust pipe to connect said upper dust shoot chamber to said dust hopper via an associated pressure releasing valve device, said exhaust pipe comprising a dependent section from said upper dust shoot chamber, a "U"-shaped section connected to said dependent section and a rising-and-bending section connected both to said "U"-shaped section and to said dust hopper, said pressure releasing valve device being placed in said dependent section, and comprising a valve seat with a resilient seal member fitted therearound, and a swingable valve the circumferential ridge of which is adapted to abut against said resilient seal member when said swingable valve is closed.

3. A dust discharging apparatus according to claim 2 wherein said upper dust shoot chamber is equipped with a suction pipe, which has a pressure equalizing valve device to permit said upper chamber to open to the surrounding atmosphere.

4. A dust discharging apparatus according to claim 3 wherein said "U"-shaped section has a drain valve device.

5. A dust discharging apparatus according to claim 1 wherein said resilient seal member around said dependent hollow cylinder has a heating tube wound on the circumference of said seal member, said heating tube being designed to permit high-temperature fluid to flow therethrough.

* * * * *